Aug. 18, 1964
D. G. PITTWOOD
3,144,947
MECHANICAL OBJECT MANIPULATOR
Filed June 29, 1961
7 Sheets-Sheet 1
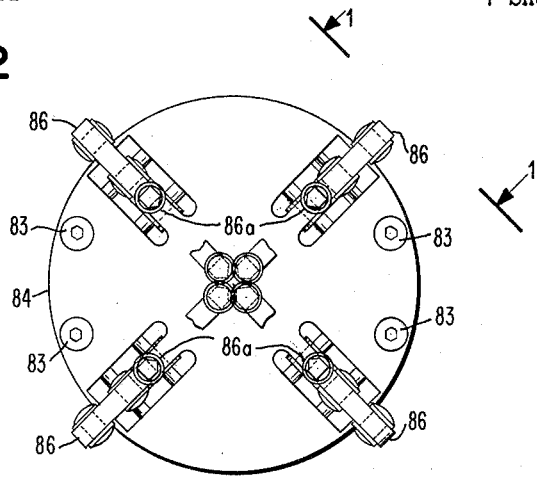
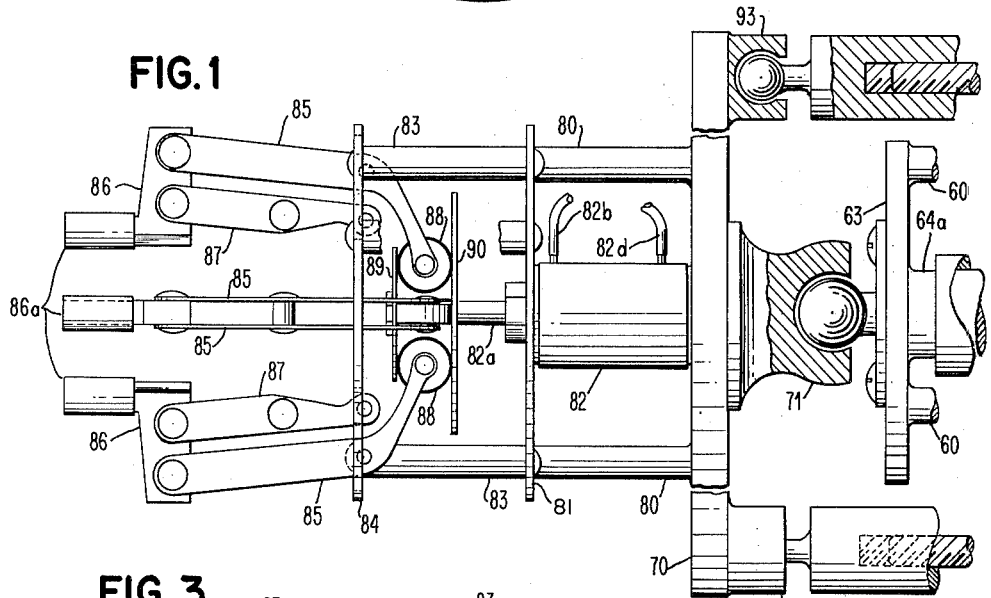
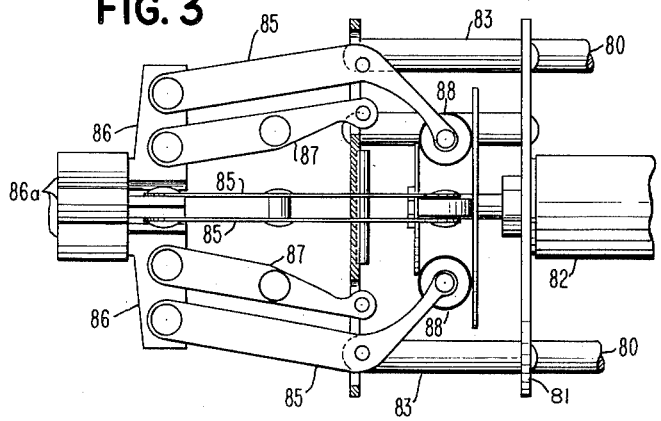
INVENTOR
DONALD G. PITTWOOD
BY
ATTORNEY Aug. 18, 1964  D. G. PITTWOOD  3,144,947
MECHANICAL OBJECT MANIPULATOR
Filed June 29, 1961  7 Sheets-Sheet 5

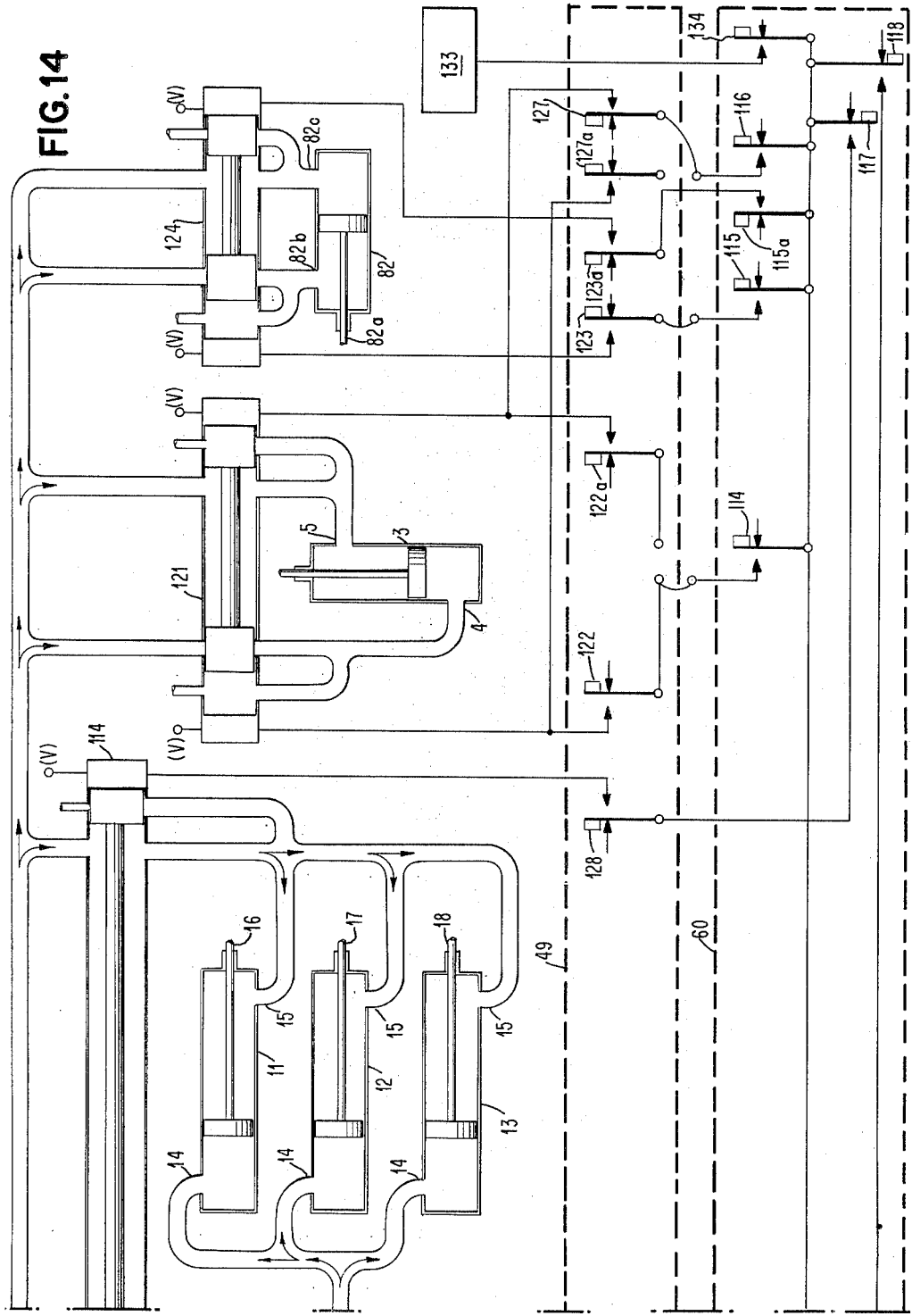

3,144,947
MECHANICAL OBJECT MANIPULATOR
Donald G. Pittwood, Salt Point, N.Y., assignor to International Business Machines Corporation, New York, N.Y., a corporation of New York
Filed June 29, 1961, Ser. No. 120,786
12 Claims. (Cl. 214—1)

The present invention is directed to apparatus for moving a device in space and is particularly suited for use in mechanical arm systems used for moving and otherwise manipulating in space objects on which work may be performed.

In the past, there have been made a first class of mechanical manipulators adapted to be controlled (programmed) by external machines and another class of manipulators adapted to be directively and remotely controlled by a human operator. Machine controlled apparatus has found use where simple, repetitive tasks are to be performed on each of a plurality of work pieces, while the remotely controlled apparatus has been employed in situations where the nature of the work to be performed (for instance, the handling of radioactive material) makes the presence of a human operator undesirable or impossible. In the case of the machine controlled apparatus, the problem of position-controlling the object handling device as well as the control of the operation of the handling device itself have necessitated the use of complex apparatus, with the result that the cost of such apparatus has limited the development of machinery capable of performing other than the most elementary tasks. In the case of remotely controlled apparatus, the control by a human operator remote from the site of the device has allowed complex (and therefore more versatile) apparatus to be used without affecting the cost of such apparatus to the extent indicated in connection with available, machine controlled manipulators. However, the human operator controlling such apparatus is responsible for making decisions in order to control positioning of the apparatus. For this reason, apparatus of the latter class is not particularly adapted to machine control. Since it is desirable to perform repetitive, non-skilled tasks by other than human control, it can be said that automatically controlled handling apparatus presently available is wanting in that it is not generally adequate to perform work involving handling objects located at many points in space under machine control.

Accordingly, it is an object of the present invention to provide new and improved apparatus for handling objects.

Another object of the present invention is to provide new and improved apparatus for handling objects which may exist in arbitrarily fixed locations in space.

Another object of the present invention is to provide new and improved object handling apparatus which is particularly adapted to be operative with respect to such objects located in positions chosen among points in space which are continuously variable.

Another object of the present invention is to provide new and improved apparatus for handling objects under the control of commands generated by a stored program device.

Another object of the present invention is to provide a new and improved handling apparatus which includes a manipulating device for engaging objects, and which is particularly adapted to maintain that device in a constant attitude as the device and the object engaged thereby are moved in space.

In accordance with the principles of the present invention, there is provided an object engaging device, such as a mechanical hand, to be maneuvered in space with respect to a frame member or structure from which the object engaging device is controlled. In order to directively move the afore-mentioned device, there is provided a group of actuating members, such as air cylinders having pistons, each movable along its own length with respect to the frame member. Means is provided for connecting each piston to the afore-mentioned device, so that as the various members are actuated (for instance, as the pistons are independently advanced away from the retracted positions), the device controlled thereby may be moved transversely and rotationally with respect to the frame member. To this end, control means is provided for independently and directively moving each of the pistons along its own length. In order to cause the pistons to move the device to a particular point in space with respect to the frame member, there is provided at least one set of stop means having individual members settable to independently engage a detent borne by and therewith arrest the motion of each of the pistons at a selected point along that piston's length of movement. With this combination of elements it is to be seen that the device may be moved to a particular point in space with respect to the frame member in accordance with the setting of the stop means individual to each of the various pistons. Further, there are provided sets of such stop means carried on a drum which is rotatably indexable for serially bringing each set of stop means into operative relationship with the appropriate piston detents, so that the manipulator can be programmed to bring the device to a set of predetermined points in space by effecting alternate operation of the drum and control means.

The foregoing and other objects, features, and advantages of the invention will be apparent from the following more particular description of a preferred embodiment of the invention, as illustrated in the accompanying drawings.

FIGS. 1 and 2 show side and front views, respectively, of a manipulating device or a mechanical hand with the fingers open;

FIG. 3 shows a side view of the FIGS. 1 and 2 hand with the fingers closed;

Figure 4:
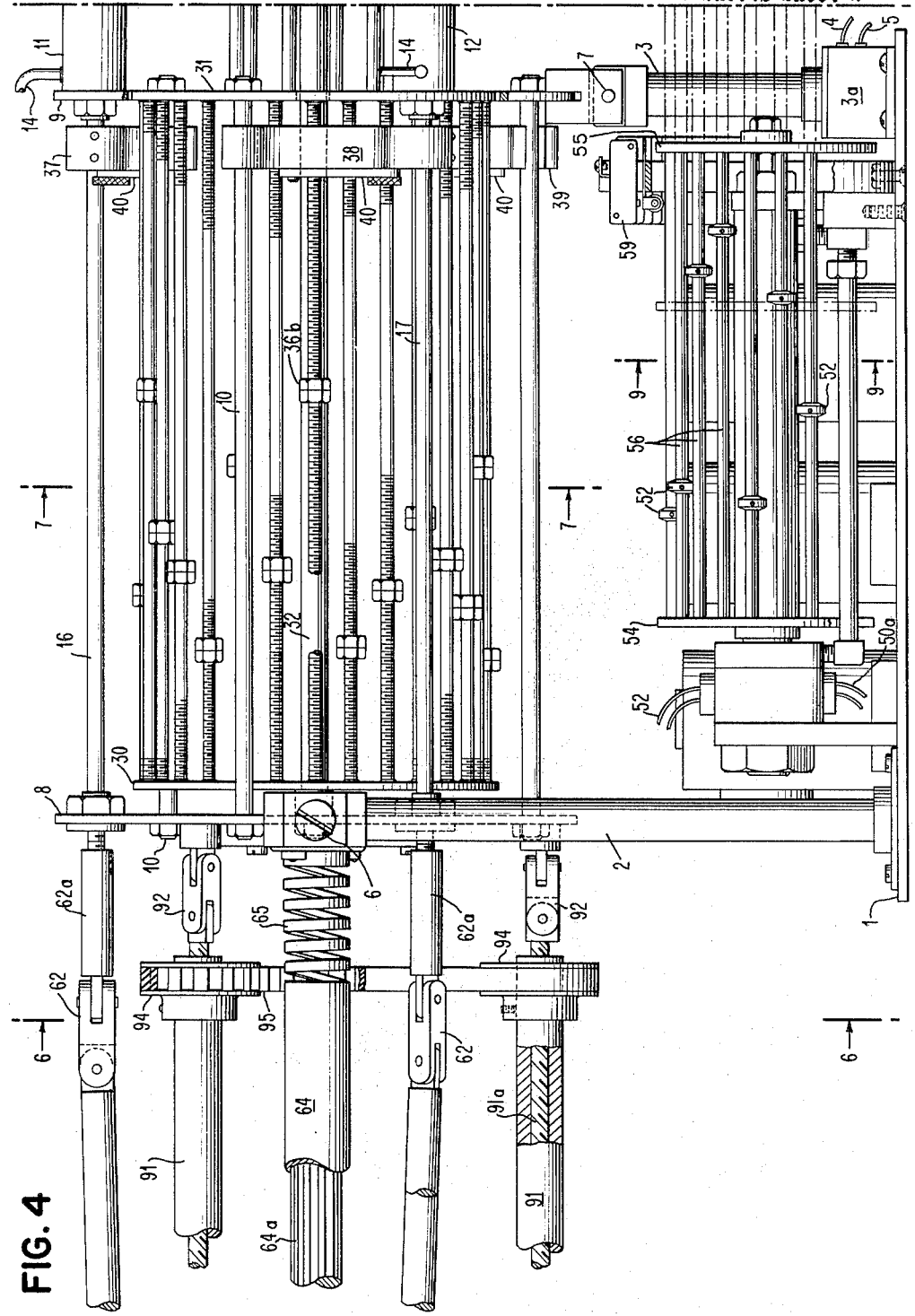
Figure 5:
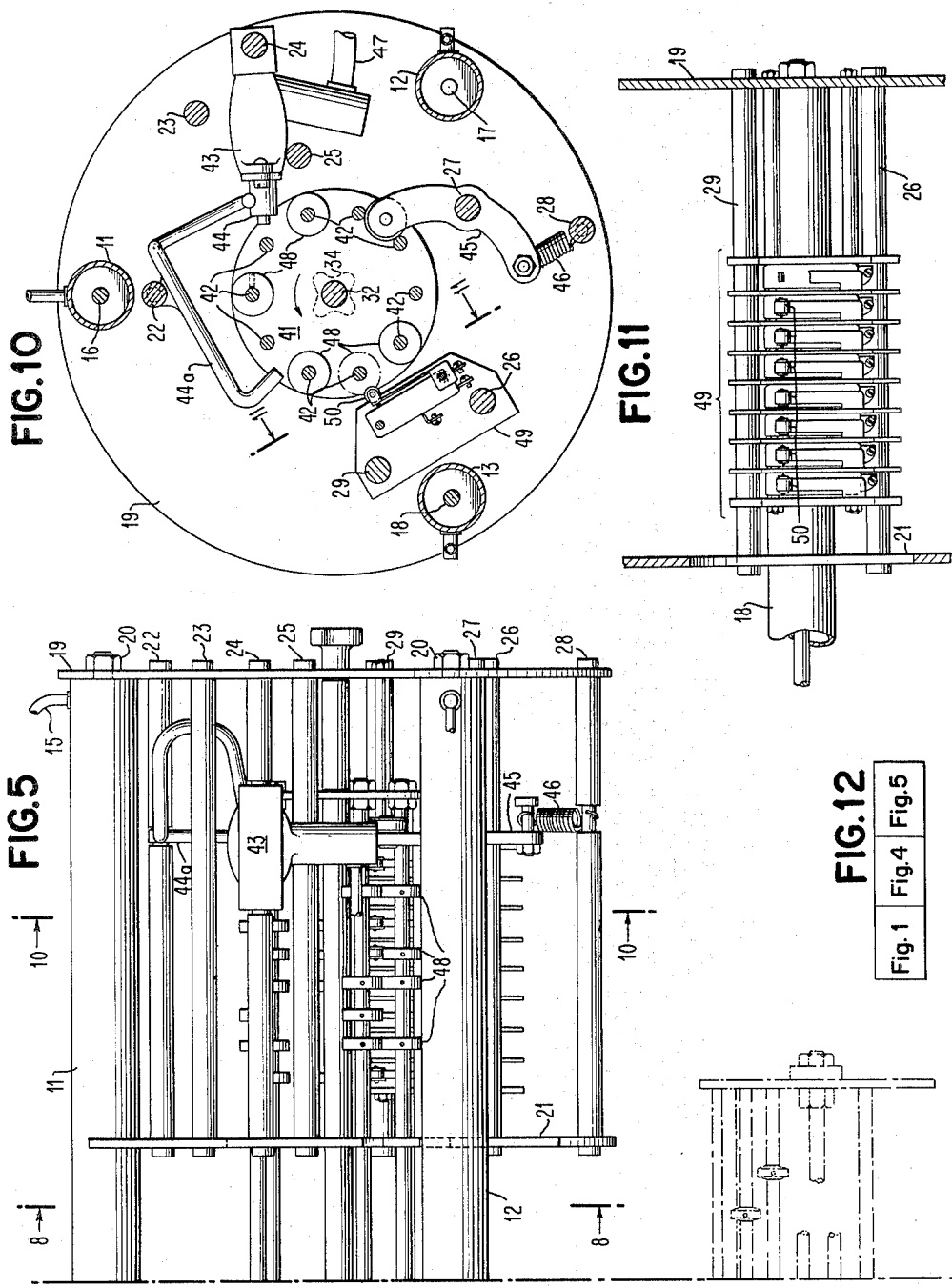
Figure 6:
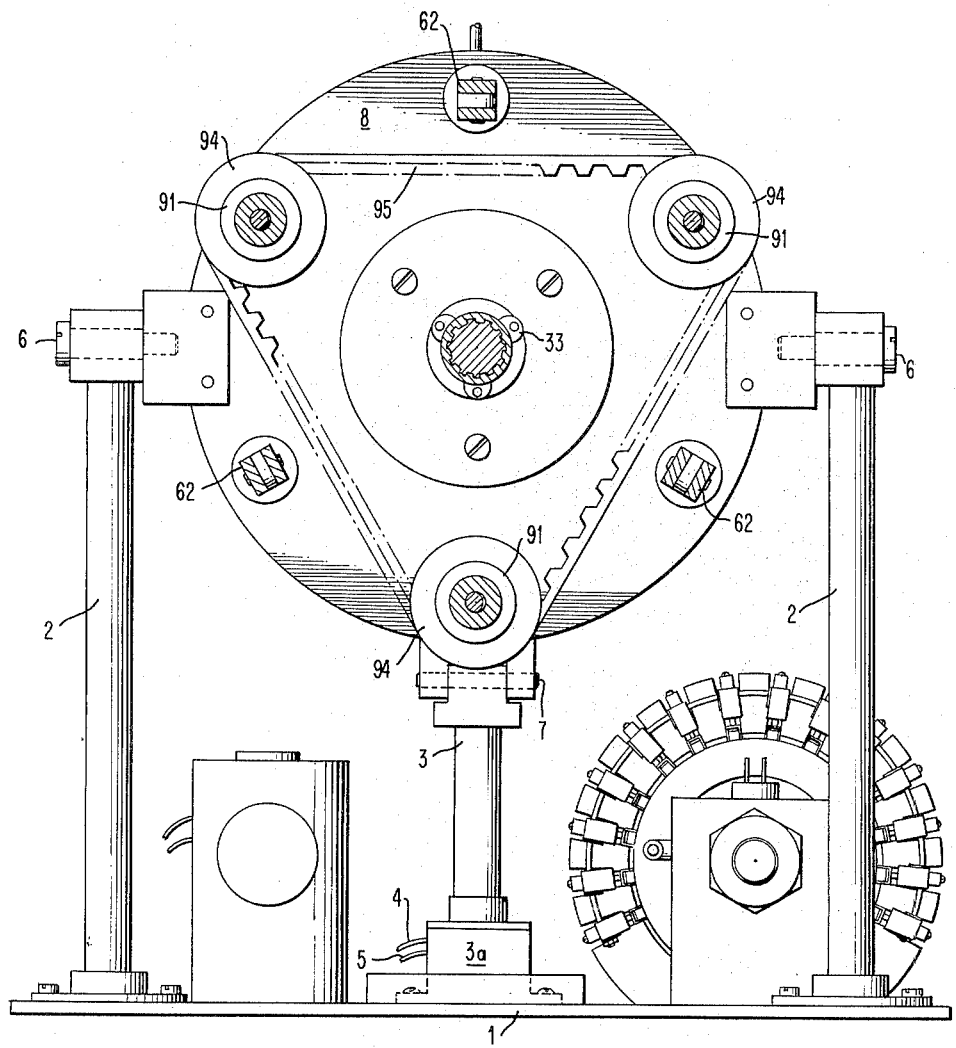
Figure 7:
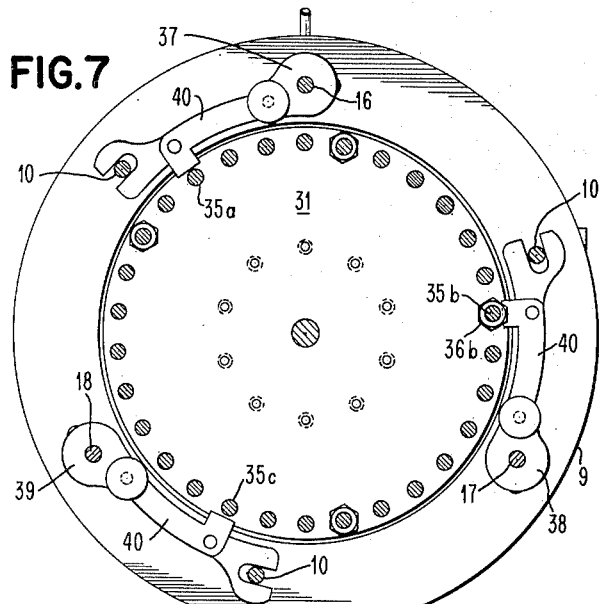
Figure 8:
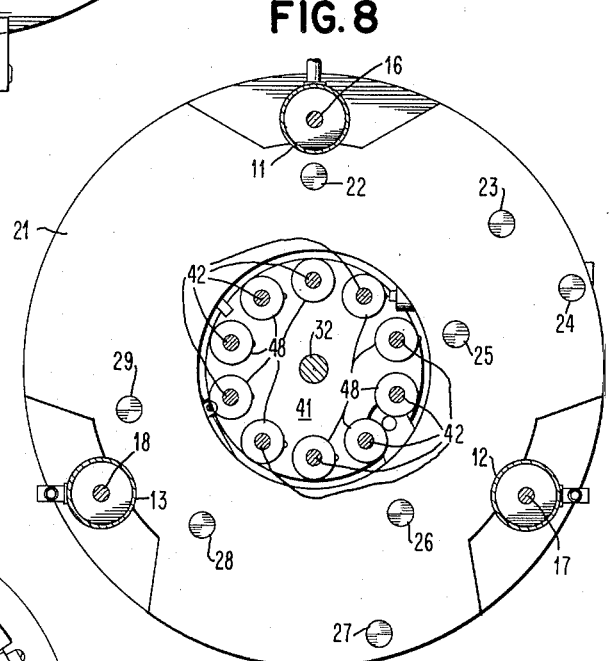
Figure 9:
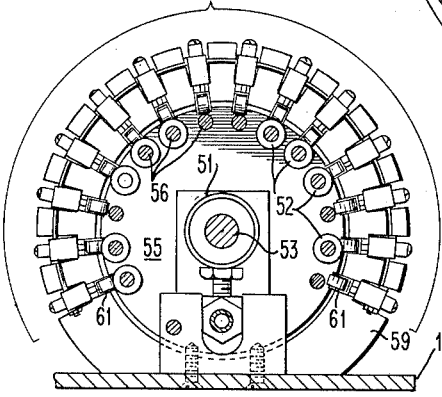
Figure 13:
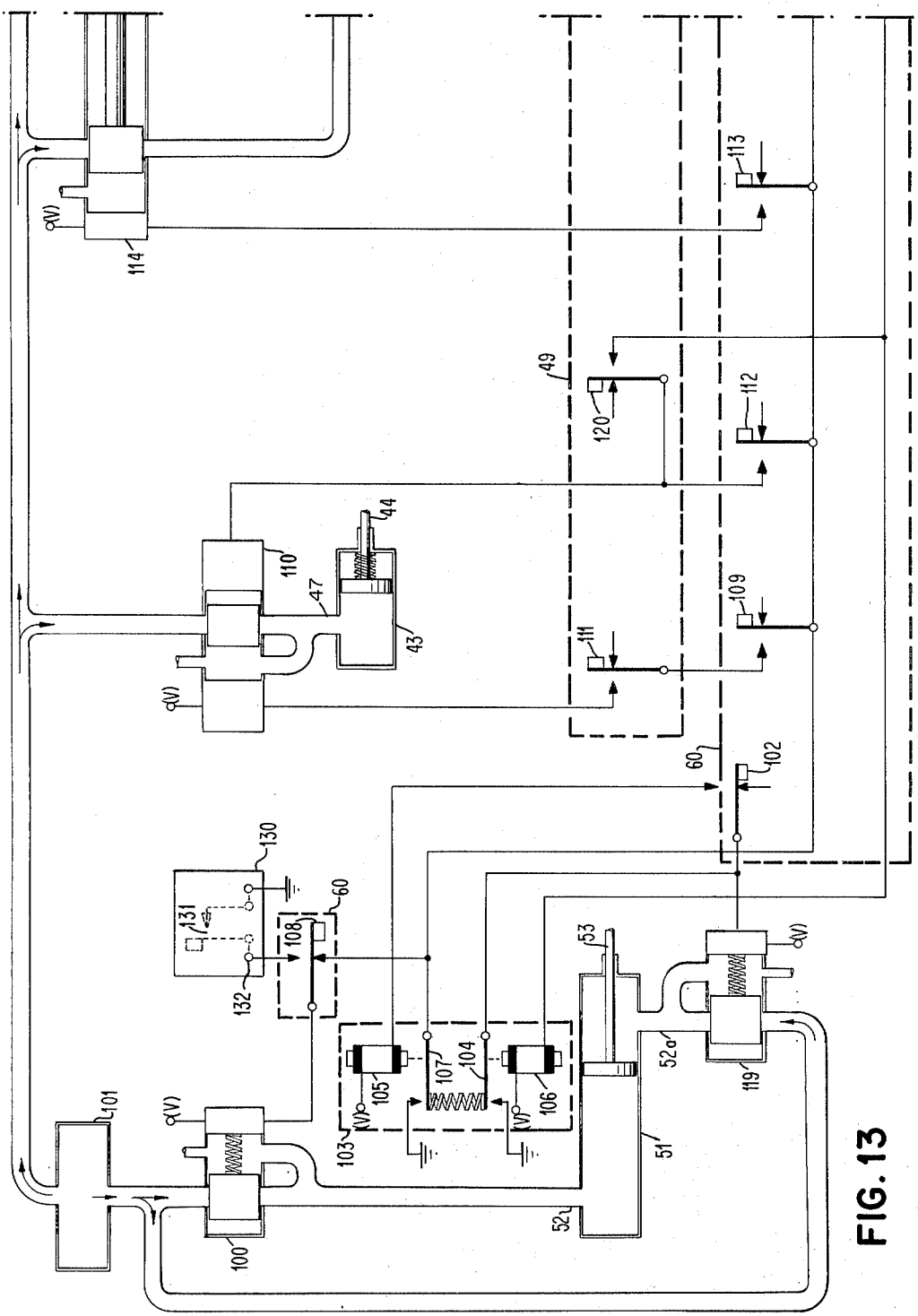

FIGS. 4 and 5 taken in combination with FIG. 1 show a side view of the mechanism in which the present invention is practiced;

FIGS. 6, 7, and 9 show cross-sectional views taken through the structure shown in FIG. 4;

FIGS. 8 and 10 show cross-sectional views of the structure shown in FIG. 5;

FIG. 11 shows a cross-sectional view as indicated in FIG. 10 of a part of the structure shown in FIG. 5;

FIG. 12 shows the order in which FIGS. 1, 4, and 5 are to be arrayed; and,

FIGS. 13 and 14 show a schematic electrical and fluid system diagram of equipment used for controlling the apparatus shown in FIGS. 1–11.

*Structural Description*

In the paragraphs which follow, there is described the mechanical configuration of apparatus in which the present invention is practiced. It is pointed out that while various pieces of equipment incorporated therein are electrically controlled, others are operated by fluid pressure. For the purpose of simplifying the mechanical description and the drawings, the various electrical pressure lines for bearing fluid under pressure have been omitted from the mechanical showing in FIGS. 1–11. It is further pointed out that the schematic electrical and fluid system diagram shown in FIGS. 13 and 14 and the accompanying description of those diagrams adequately explain the operation and control of apparatus shown in FIGS. 1–11 for the purpose of teaching the present invention to those skilled in the art. Certain complex equipment, such as air-actuated cylinders, is called out in the present description; in those cases where such equipment is commercially available and the operation commonly understood by those skilled in the art, a detailed explanation of the operation is omitted because such equipment per se does not constitute the present invention and is not necessary for those wishing to gain understanding of the present invention.

*Frame assembly.*—Referring to FIGS. 1, 4, and 5, the present apparatus has a frame assembly which includes mounting base 1 having a pair of upright columns 2 extending upwardly therefrom adjacent the left hand edge of base plate 1. In the following paragraphs areas adjacent to this end of base plate 1 are arbitrarily designated as "front," "forwardly extending," etc., as appropriate. Similarly, equipment adjacent the opposite edge of plate 1 is referred as being "rearwardly extending." At the rearward edge of plate 1 and extended upwardly is a third, extensible column 3, the extensible portion being the piston member of an air cylinder assembly which includes a chamber 3a as well as ports 4 and 5, with the result that the height of column above base 1 may be varied in accordance with the flow of fluid through ports 4 and 5.

Pivotally fixed to the upper ends of columns 2 by any suitable means such as screws 6 and to the upper end of column 3 by screw 7 is a frame assembly comprising circular plates 8 and 9, which may be formed from flat pieces of metal. Members 8 and 9 are maintained in spaced, parallel, co-axial relationship to each other by means including stay bolts 10 and nuts borne thereby. Stay bolts 10 are disposed on plates 8 and 9 to be substantially parallel to each other and define a cylinder of revolution which is substantially concentric with plates 8 and 9. To the frame thus formed there also are fixed to extend rearwardly from member 9 first, second, and third air cylinders 11, 12, and 13, respectively. Each of cylinders 11, 12, and 13 is double acting and accordingly has ports 14 and 15. The admission of air to port 14 of any of cylinders 11, 12, and 13 is effective for urging the appropriate one of pistons 16, 17, and 18, respectively, of those air cylinders forwardly and away from a normal, retracted position with respect to the frame structure. The pistons are journaled to plates 8 and 9 and therefore are spaced apart from each other and guided by plate members 8 and 9. The pistons 16, 17, and 18 are journaled to plates 8 and 9 in such a manner that they are parallel to each other and define a cylinder of revolution which is substantially concentric with plates 8 and 9. The use to which these pistons 16, 17, and 18 are put is to be described presently.

At the rearward end of cylinders 11, 12, and 13 there is provided an additional frame plate 19 which is fixed by any suitable means, such as threaded nuts 20 to the rearward facing ends of the air cylinders. Positioned intermediate members 9 and 19 is plate 21 having cut-out sections for admitting passage of cylinders 11, 12, and 13. Plate 21 is supported from plate 19 by studs 22–29 inclusive, the ends of which are fixed in any suitable manner to plates 19 and 21. Plates 19 and 21 are positioned with respect to the remainder of the frame assembly to be substantially co-axial with and parallel to the previously described plates 8 and 9. In addition to the above-described function of maintaining cylinders 11, 12, and 13 in spaced relationship, plates 19 and 21 and the studs 22–29 extended therebetween support to the apparatus yet to be described.

*Drum assembly.*—Within the above-described frame assembly, there is provided a rotatable drum assembly. A principal purpose of the drum is to bear a plurality of sets of stop devices, each member of each such set of devices being positionable with respect to detent apparatus borne by a particular one of the above-described pistons 16, 17, and 18. The exact manner in which a particular set of stop devices is made effective is to be described presently.

The afore-mentioned drum assembly includes circular end members 30 and 31 which are fixed to and co-axial with main shaft 32. Main shaft 32 is appropriately journaled by bearing means 33 and 34 carried on plates 8 and 19, respectively, of the frame assembly. Bearing means 33 and 34 are positioned on plates 8 and 19 so that the drum assembly including plates 30 and 31 is substantially concentric with the above-mentioned cylinder of rotation defined in space by pistons 16, 17, and 18. Extending between plates 30 and 31 are a plurality of sets of threaded, stop-bearing studs, such as the set including studs 35a, 35b, and 35c indicated in FIG. 7. These stud sets are fixed by any suitable means to plates 30 and 31 and are disposed concentrically with respect to shaft 32 as well as with respect to pistons 16, 17, and 18. On each stud within each set and in engagement with the afore-mentioned thread thereon, there is provided double stop nut assembly, so that the effective, rearward-facing surface of the rearward nut of each set can be independently positioned and fixed along the length of the stud on which it is borne.

Fixed to a point on each of pistons 16, 17, and 18 which is to be moved within the space lying between plates 8 and 19 of the frame assembly, there are provided detent assemblies 37, 38, and 39, respectively. Each such detent assembly includes a portion slidably embracing one of the afore-mentioned studs 10 which is adjacent to one of pistons 16, 17, and 18 under consideration. Such a detent assembly is guided by the portion embracing the stud 10 as the piston on which the detent is carried is advanced away from plate 9 toward plate 8 of the frame assembly by virtue of the operation of the appropriate one of air cylinders 11, 12, and 13. Each of detent assemblies 37, 38, and 39 includes a member 40 which in turn has a portion extending from the assembly in the direction of shaft 32 for the purpose of engaging one of the above-described stop nut assemblies. Each of the sets of studs, such as 35a, 35b, and 35c is disposed on the presently considered drum assembly so that the appropriate stud of the set is radially aligned with the dependent portion of the appropriate one of detent assemblies 37, 38, and 39 when shaft 32 and the rest of the drum assembly has been indexed to one of the number of positions which it may occupy. With this arrangement, it is to be seen that by indexing the drum assembly to particular positions, various sets of studs (such as 35a, 35b, and 35c) are positionable to dispose the effective surface of the stop nuts borne thereby to engage the appropriate one of detent assemblies 37, 38, and 39, during the advance of pistons 16, 17, and 18 away from their normal, retracted positions toward plate 8. It is further to be seen that by appropriately positioning stop nuts (such as those in the set in which 36b is included) on each stud of such a set, the forward motion of each of pistons 16, 17, and 18 can be arrested at a particular point along its travel path. With this arrangement, there can be as many combinations of travel distances for pistons 16, 17, and 18 as there are sets of studs on the drum assembly. The number of stud sets shown in the embodiment is 10.

In order to control the indexing of the drum assembly including shaft 32 in the counter clockwise direction as viewed in FIG. 7, there is provided an extension of the above-described drum assembly which includes circular end plate 41 fixed to and disposed concentrically with shaft 32 at a point on the shaft lying between frame plates 21 and 19. A plurality of studs 42 extending between plates 41 and 31 and fixed by any suitable means to those plates are regularly disposed with respect to each other about shaft 32. Studs 42 are provided to be engaged one at a time by plunger portion 44 of a pneumatic actuator assembly 43 (which is described hereinafter).

Each of studs 42 is individual to one set of the above-described stop nuts 36 and the stud set on which those nuts are threaded. Studs 42 are disposed with respect to the remainder of the drum assembly so that when the drum assembly occupies a first of two consecutive positions, a particular set of stop nuts such as 36a, 36b, and 36c is positioned to engage detent assemblies 37, 38, and 39. In order to accurately fix the rotational position of the drum assembly in this manner, there is provided pawl 45 rotatably mounted on stud 28, as shown in FIG. 10. The outer end of pawl 45 is joined by spring 46 to stud 27, so that the rounded, inner end of pawl 45 is urged by spring 46, to drop between two adjacent studs 42 and therewith urge the drum assembly to assume a particular rotational orientation with respect to the above-described frame assembly.

Turning to the consideration of pneumatic actuator 43 which is journaled to and free to revolve within limits about stud 24, the application of air pressure to inlet 47 of actuator 43 is effective for causing plunger 44 to be extended away from the body of actuator 43 and into engagement with one of studs 42, thereby applying a torque to that stud and the drum assembly which is sufficient to raise pawl 45, the linear motion of plunger 44 also being sufficient to allow the drum to be rotated in a counter clockwise direction as viewed in FIG. 10 to the point where pawl 45 falls between the next adjacent pair of studs 42 encountered as the drum assembly is rotated in the afore-mentioned counter clockwise direction. In order to further control the rotation of the drum assembly, there is provided an escapement arm 44a rotatably borne by stud 22 and having one end pivotally connected by any suitable means to plunger 44 and remote therefrom extending to a point adjacent to another of studs 42. By the inclusion of arm 42a, the rotary motion of the drum assembly is inhibited except when plunger 44 is extended away from the body of actuator 43 and therewith withdraws the above-described remote end of arm 44a from a point where it blocks rotational movement of the stud 42 and the drum assembly.

Also borne on each of studs 42 are one or more disc-like actuators 48, each of which may be accurately fixed by set screw means at any point along the lengths of studs 42. As indicated in FIG. 11, there is provided a set 49 of so-called snap type electrical switches. Each switch in set 49 has an actuator 50 disposed with respect to studs 42 to advance that switch's contact set away from a normal position to an operated position when an appropriate one of members 48 is borne on the one of shafts 42 currently adjacent contact set 49 engages the actuator 50 of that switch. Thus, it is to be seen that by indexing the drum assembly under the control of pneumatic actuator 43 to a particular one of the ten rotational positions, not only can a particular set of stop means be made operative with respect to the pistons 16, 17, and 18, but also the contact sets of a desired combination of switches within set 49 can be moved from their normal to their operated positions. The use to which the contact set is put is to be more fully explained hereinafter.

*Sequence timer.*—Also mounted with the frame assembly is a so-called sequence timer which comprises air cylinder assembly 51 having ports indicated in FIG. 4 as 52 and 52a. Air cylinder 51 is operative in response to the application of air pressure to ports 52 and 52a for extending the cylinder's piston 53 in a rearward direction (away from the normal position of the air cylinder) and retracting piston 53 in a forward direction (toward the normal, retracted position of the air cylinder) respectively. A drum comprising end plates 54 and 55 and studs 56 positioned therebetween and having ends fixed in any suitable manner thereto is fixed concentrically to piston 53. The drum assembly of the sequence timer, being fixed to piston 53, may be moved with the rearward movement of piston 53 from a normal position through the circular opening of contact assembly 59 to a position indicated in phantom in FIGS. 4 and 5. A plurality of disc-like, contact actuating members 52 (individual to and positionable by set screw means at any point along the lengths of each of the various studs 56) are passed through the above-mentioned opening of contact assembly 59 as the drum assembly of the sequence timer is moved in the above-described manner. Contact assembly 59 includes a group of so-called snap action type electrical switches 60a fixed by any suitable means to the main body of assembly 59 and having actuators 61 disposed concentrically about piston 53. Switches 60a and their actuators 61 are further disposed with respect to studs 56 in such a manner that each of the members 52 borne on the studs 56 engage the appropriate ones of actuators 61 as the sequence timer drum assembly is advanced through the opening of assembly 59. In this manner, the contact set of any switch 60a can be moved from its normal position to its operated position and restored to its normal position at some point during the above-described motion of the sequence timer drum assembly. It is to be seen that the point to which any of switches 60a is actuated during the travel of piston 53 is determined by the relative position of the appropriate one of actuators 52 along the length of the studs 56 on which that actuator is borne.

With this arrangement, it is to be seen that a particular order of operations of switches 60a is effected by the periodic application of pressure to inlet 52 of air cylinder 51 and the resulting extension of piston 53 and the drum assembly borne thereby between its fully retracted position and its fully extended position. It is pointed out at this time that the sequence timer is to be periodically operated in this cylical fashion to effect certain controls of the above-described air cylinders 11, 12, and 13 and the operation of pneumatic actuator 43 as well as the manipulation of a mechanical hand or object manipulating device.

*Mechanical hand coupling.*—To the end of grasping objects in space, there is provided an assembly which includes plate 70, the assembly to be maneuvered in combinations of transverse and rotational movement with respect to the above-described frame assembly as the result of combinations of movements of pistons 16, 17, and 18. In order to effect such movement, plate 70 is flexibly attached by ball and socket joint 71 to plate 63 which in turn is fixed to the ends of each of three substantially rigid rods by any suitable means, such as set screws indicated in FIG. 1. The rods 60 extend rearwardly from plate 63 and are movably joined to the ends of pistons 16, 17, and 18. Each of these joints comprises a universal coupling joint 62 indicated in FIG. 4. This joint is of any of a number of well-known types. Joint 62 in turn is fixed by cylindrical coupler 62a to the threaded end of the appropriate one of pistons 16, 17, and 18, extending forwardly from plate 8. With this arrangement, the above-described motion of plungers 16, 17, and 18 through selectable combinations of distances is effective to impart motion to plate 70 which is both transverse and rotational with respect to a particular point on the above-described frame assembly, namely, bearing member 33 which is borne by plate 8. It is to be seen that within the limits defined by the linkage including arms 60 and the possible travel distances of pistons 16, 17, and 18, the assembly plate 70 can be maneuvered to any position in space in accordance with the setting of stop nut assemblies borne on the set of studs of the drum assembly currently selected for use with piston detent assemblies 37, 38, and 39.

In order to stabilize the motion of plate 70 as the positions of pistons 16, 17, and 18 are changed (i.e., minimize rotational movement of plate 70 and urge transverse movement of plate 70 along a straight path or a path having a consistently varying radius of curvature) there is provided stabilizer bar assembly 64 having a first, forwardly extending end fixed by any suitable means (such as the universal ball socket joint indicated in FIG. 1) to plate 70 and a second end flexibly attached to plate 8 in substantial concentricity with shaft 32 by helical spring 65 which is attached by any suitable means to plate 8 and the end of bar assembly adjacent plate 8. Bar 64 has a splined internal shaft 64a in telescoping engagement with corresponding spline members in the outer covering of bar 64, the inner member 64a being rigidly joined in any suitable manner to plate 63. Thus, the resilience of spring 65 urges the assembly including the spring to lie along a particular axis with respect to the above-described frame. During the rotational and transverse motion of plate 63 in the above-described manner, the resistance of the bar 64 to rotational movement about its own principal axis due to the presence of the above-mentioned splines as well as the resistance of the bar to rotational displacement with respect to frame member 33 caused by flexible coupling spring 65 (i.e., mechanical damping) is effective for causing the bar to move in a substantially continuous path from the normal, retracted position to an extended position in space or from one point in space to another point in space.

*Mechanical hand assembly.*—The manipulating device which includes plate 70 mentioned above also includes a hand portion extending in a direction forward with respect to plate 70. Referring to FIGS. 1, 2, and 3, the hand mechanism is mounted on parallel studs 80 which are fixed to and extend forwardly from plate 70 and which support plate 81 parallel to and apart from plate 70. Double acting air cylinder 82 is fixed to plate 81 and has an actuating portion disposed between plates 70 and 81. Piston 82a of air cylinder 82 extends forwardly from plate 81. Accordingly, the application of air pressure to port 82b of cylinder 82 is effective for retracting piston 82a away from its normal, extended position in a rearward direction with respect to plates 81 and 70 when pressure is applied to port 82b, and is urged in the opposite direction when air pressure is applied to port 82c. Also extending forwardly from plate 81 are parallel studs 83 which support and space plate 84 apart from plate 81. Both bar assemblies 85 and 87 of each of four substantially identical sets of parallel bar actuators are pivotally attached by any suitable means to plate 84. The bar actuator pairs extend through openings suitably disposed in plate 84, the above-described pivotal mounting means being disposed on plate 84 so that each bar actuator is free to move in a plane 90° displaced from the place of movement of the next adjacent ones of the actuator assemblies, and all such movement planes converge in a common line which is substantially coincident with the movement axis of piston 82a and which further is effective to define an arbitrary axis of orientation for the manipulating device. Pivotally fixed to the outwardly extending ends of each pair of bar assemblies 84 and 87 is a finger device 86 having a working surface inwardly facing and substantially parallel with respect to the above-described axis of the manipulating device.

The end of each bar assembly 85 which extends rearwardly from plate 84 is offset in the direction of the above-described axis of the manipulating device and carries a roller 88. In order to make finger portions 86a close on the above-mentioned axis, there are provided parallel plates 89 and 90 spaced apart from each other and fixed to piston 82a. The above-mentioned roller member 88 fixed to the ends of each of the various bar assemblies 85 is disposed between plates 89 and 90. With this arrangement, the retraction extension of piston 82a in the above-described manner is effective for forcing finger members 86a together and apart from each other, respectively. It is to be seen that the parallel relationship of the above-mentioned working surfaces of members 86a is maintained in parallel relationship to each other throughout such movement.

In order to establish a constant parallel relationship between the above-described axis of the device with respect to an axis of the above-described frame assembly as defined by the axis of main shaft 32 when the device is maneuvered in space under the control of plungers 16, 17, and 18 in the previously described manner, there are provided three or more substantially identical extensible bar or screw jack assemblies 91 which extend between plate 8 of the frame assembly and plate 70 included in the hand device. As indicated in FIGS. 1 and 4, each bar assembly includes a first, externally threaded rod 91a which extends into and is received by corresponding internal threads within the main housing of each assembly 91. In order to secure the rearwardly facing end of each member 91a non-rotatably about its own length to plate 8, there is provided a universal joint 92 for coupling the end of member 91a to plate 8 in such manner that assemblies 91 may be freely pivoted about the point on plate 8 to which it is fixed. The universal device is generally indicated in FIG. 4 and is similar to element 62 described above used for coupling rods 60 to plate 8.

The assemblies 91 are fixed in the above-described manner to points radially and angularly displaced from each other, from the axis of bearing member 33 and from rods 60. The opposite, outwardly facing ends of members 91 into which the threaded rods are telescoped are rotatably fixed by bearing means 93 to points on plate 70 which are disposed in substantially the same radial and angular relationship with respect to each other, rods 60 and the axis of ball and socket joint 71 as the above-described relationship between members 91 and plate 8. The outward facing ends of members 91 are joined to plate 70 by ball-socket couplers 93, which in turn have forwardly extending ends fixed to the rotatable portion of revolvable bearing members 93. With this arrangement, the outward facing portion of each member 91 may be rotated freely about its own axis to extend or contract its own length as the hand assembly including plate 70 is moved in a forward and reverse direction.

From the previously described dispositions of the ends of assemblies 91 on plates 8 and 70, it is to be seen that by adjusting the lengths of members 91 to be equal to each other by independently rotating appropriate ones of the outward facing parts of assemblies 91 at the time the assembly is made up, an original parallel relationship between the frame axis and manipulating device axis is established. Such parallelism among members 91 and therefore plates 70 and 8 is preserved as plate 70 is moved rotationally with respect to frame member 33.

From the above description of extensible members 91, it is to be seen that as plate 70 is advanced or retracted transversely with respect to frame member 33 under the action of pistons 16, 17, and 18, the outer portions of members 91 revolve about their own lengths in order to allow the length of the various members 91 to adjust. In order to preserve the above-mentioned parallel relationship among the various members 91 and between plates 70 and 8, it is necessary to insure that the angular travel of the outer member of each of the various members 91 is substantially equal. To this end, there is provided means comprising pulleys 94 having toothed working surfaces fixed to the outer shells of the various members 91, the various pulleys being interconnected by timing belt 95. The toothed surfaces of the pulleys and the corresponding belt surfaces are in locked engagement, so that the rotation of any one of the members 91 through a particular angle is effective to cause belt 95 to rotate the other members 91 through an equal angular distance, therewith maintaining plates 70 and 8 parallel to each other.

*Operational Description*

The mechanical disposition and actuation of elements in combination employed in the preferred embodiment of the present invention have been set forth in the foregoing section of the present description. The manner in which operation of such elements is controlled is next described.

In the subsequent paragraphs, reference is made to the schematic showing of the above-described manipulator elements and of the power regulating apparatus used to control the manipulator. This schematic showing is set forth in FIGS. 13 and 14 wherein the above-described elements are called out by the same numbers as those employed in the foregoing structural description section. The control apparatus includes elements, such as solenoid valves, snap type electrical switches, and the like. Such apparatus is chosen among wares offered for sale commercially and is well understood by those skilled in the art. Therefore, a detailed description of such control apparatus is not included in the paragraphs which follow, the control apparatus per se not forming the presently claimed invention.

Electrical power for energizing certain control apparatus may be drawn from any suitable source, such as the battery which is employed to operate with the preferred embodiment of the present invention. While this source is not shown in the above-mentioned FIGS. 13 and 14, it will be readily understood by those skilled in the art that one terminal of this battery which is connected to a common ground (indicated in the drawings by a conventional symbol) forms a common return path to the battery which is hereinafter referred to as "ground." The conductors connected to the other, ungrounded battery terminal and represented in the drawings by the symbol (V) are connected appropriately to apparatus in which electric power is to be used, and are hereinafter referred to as "battery." Other control of the manipulator is effected by air under pressure furnished from a common reservoir or tank shown schematic in FIG. 13 as 101. It is assumed that means (not shown) may be provided for maintaining pressure within reservoir 101 at a substantially constant value.

From the foregoing description of the sequence timer, it is to be recalled that the switches of set 60a are operable under the control of double acting cylinder 51 as piston 53 of that cylinder is extended and retracted. In the following description it is assumed that the above-described members 52 have been appropriately positioned to operate the switches 102, 109, 112, 113, 114, 115, 116, and 117 of set 60a in the order named as piston 53 is advanced from its normal retracted position to its fully extended position. It is further assumed that the appropriate member 52 has been positioned to operate switch 102 when piston 53 is in its fully retracted or home position.

In the paragraphs which follow, the choice of the program step described is made for purposes of illustrating the capabilities of the presently claimed invention. It is to be understood that any program step may be modified appropriately from the one described in order to meet the needs of the system which includes the presently shown manipulator.

*Cyclical operation of the sequence timer.*—In order to make the sequence timer operate the switches of set 60a through successive cycles and therewith furnish the control apparatus with cycles of command signals which in turn are effective to cause the manipulator to carry out a step in a program of movements stored on the above-described drum, there is provided apparatus including latch type relay 103 for marking the start of each cycle operation of the sequence timer. Relay 103 includes first and second windings 105 and 106, respectively. Windings 105 and 106 are effective in response to the energization thereof for closing make contacts 107 and 104, respectively. Relay 103 is maintained in its currently operated position after the energizing current has been removed from its winding. The armatures of the two relay windings are suitably mechanically linked, so that the closing of relay contacts 107 is effective to open contacts 104 and vice versa, as suggested by the insulated spring shown in the drawings interconnecting the movable contact members of those contact sets.

At the outset of a cyclical operation of the sequence timer, piston 53 is in its normal, retracted position, contacts 102 are operated, and relay 103 is operated to the point where contacts 104 are closed and contacts 107 are opened. Under these circumstances, a circuit for energizing relay winding 105 is completed from ground through make contacts 104 and 102 and winding 105 to battery, so that relay contacts 107 close and relay contacts 104 open. Upon the closing of relay contacts 107, a circuit is completed for operating the normally closed path through spring return type solenoid valve 100 in order to start the advance of piston 53. The circuit for energizing the valve 100 winding is traced from ground through make contacts 107, the break portion of contact set 108, and the winding of valve 100. Valve 100, which normally is effective to block the passage of air from reservoir 101 responds to the continued flow of current through its winding to open and therewith admit air from reservoir 101 through port 52 into cylinder 51. The continuing flow of air from reservoir 101 into cylinder 51 through port 52 causes piston 53 to advance at a particular rate and therewith operate the various contacts of set 60 with the results described below.

As piston 53 continues to advance and eventually is effective for operating (closing) contacts 118, a circuit is completed for energizing winding 106 of relay 103. The latter is traced from ground through make contacts 107 and 118 and relay winding to battery. Energization of winding 106 is effective for opening contacts 107 in order to allow valve 100 to cut off the flow of air from reservoir 101 through port 52 of cylinder 51, with the result that the forward motion of piston 53 is stopped. Closing of relay contacts 104 which also is effected at this time completes an obvious circuit for energizing the solenoid winding of normally closed, spring return type valve 119, therewith causing that valve to admit air from reservoir 101 through port 52a of cylinder 51 to the opposite side of the piston 53. Thereupon piston 53 is returned to its normal, retracted position. The rate at which air is admitted through valve 119 is such that the rate of return of piston 53 is faster than its rate of advance.

*Indexing.*—Indexing the manipulator drum may be started when contact 109 is operated during the advance of piston 53. In normal operation, an indexing operation is to take place during a cyclical operation of the sequence timer and during the period that the drum occupies a certain angular position in which contacts 111 of drum contact set 49 are closed. Under these conditions, a circuit is completed for energizing the left-hand winding of double acting solenoid valve 110 which normally is effective for blocking the flow of air from reservoir 101 to the cylinder portion of pneumatic actuator 43. This circuit is traced from ground through now operated make contacts 107, 109, and 111 and the winding of valve 110 to battery. The energization of the left-hand winding of valve 110 is effective for admitting air from reservoir 101 through the port of pneumatic actuator 43, so that plunger 44 of that actuator is extended and therewith indexes (rotates) the above-described drum assembly to its next adjacent angular position. Valve 110 remains in the last-described position until its right-hand winding is energized in the next-described manner.

Upon closing of make contacts 112 during the continuing advance of piston 53, a circuit is completed for energizing the right-hand winding of valve 110. The latter circuit is traced from ground through make contacts 107 and 112 to the winding of the valve. Valve 110 is therefore restored to its normal condition to block the flow of air thereto from reservoir 101 and to allow pressure to be removed from actuator 43. As a result, plunger 44 is retracted to its normal position under the urging of the actuator plunger biasing spring.

*Blank indexing.*—Blank indexing is defined as the immediate restarting of another cycle of sequential timer operations without an intervening operation of the manipulator. Blank indexing is achieved at the time the above-described closing of valve 110 is effected. In the event that a blank indexing operation is to take place, the closure of contact set 112 with the drum in the position to be blank indexed finds contacts 120 of set 49 in operated condition. Closure of contacts 120 at this time completes an obvious extension of the above-described circuit for energizing the right-hand winding of relay 110 to winding 106 of relay 103, which thereupon operates. As in the above-described case of resetting the sequence timer, the energization of winding 106 and the resulting closure of contacts 104 and opening of contacts 107 is effective for causing the sequence timer piston 53 to withdraw to its normal, retracted position and to therewith start another cyclical operation.

*Extending the mechanical hand.*—Assuming that the blank indexing operation described above has not taken place and that piston 53 continues to advance during a normal cyclical operation of the sequence timer, it is assumed that the next desired operation to be effected is that advance of pistons 16, 17, and 18 in order to direct the above-described mechanical hand to a position in space in accordance with the adjustment of the stop apparatus on the stop set currently selected for use, i.e., in accordance with the rotational position currently occupied with the manipulator drum. To this end, contacts 113 of set 59 are closed to complete a circuit for energizing the left-hand winding of four-way solenoid valve 114 which normally is maintained effective for blocking the flow of air from reservoir 101 through ports 14 of air cylinders 11, 12, and 13, and effective for admitting air from reservoir 101 through ports 15 of those cylinders. As a result, pistons 16, 17, and 18 of those cylinders normally are retracted. The circuit for the left-hand winding of valve 114 is traced from ground through make contacts 107 and 113 and the winding of valve 114 to battery. The energization of the left-hand winding of the valve 114 admits air from reservoir 101 to the various ports 14 of air cylinders 11, 12, and 13 and shuts off the flow of air from reservoir 101 through ports 15. Consequently, pistons 16, 17, and 18 are advanced until their motion is arrested by the various stop devices borne by the manipulator drum. In this manner pressure is maintained in cylinders 11, 12, and 13 until the right-hand winding of valve 114 is energized in the above-described course of cyclical operation of the sequence timer.

*Vertical motion of the extended hand.*—Upon the advance of the manipulator of the mechanical hand to a particular point in space it may next be desired to elevate or lower the hand in accordance with the needs of the program to be carried out. Assuming that a lowering operation is required, the closing of contact set 114, which takes place as piston 53 continues its cyclical advance, is effective to command the start of the lowering operation. In this event the program step currently being executed as expressed in terms of operated contacts within set 49, completes a circuit for energizing the left-hand winding of four-way solenoid valve 121. The latter circuit is traced from ground through make contacts 107, 114, and 122 and the winding of valve 121 to battery. In its normal condition, valve 121 is effective to block the flow of air from reservoir 101 through port 4 of air cylinder 3, and to admit air from the reservoir through port 5. As a result, the piston (or extensible portion) of cylinder 3 normally is maintained in its retracted position. The energization of winding of valve 121 is effective for causing that valve to admit air from reservoir 101 to port 4 of rear frame supporting air cylinder 3, therewith causing the extensible portion of air cylinder 3 to be raised. Consequently, the frame assembly including the extended mechanical hand device is pivoted with respect to the frame mounting about the described pivotal connections between the frame and the upper ends of columns 2. Valve 121 and air cylinder 3 are maintained in this condition until the right-hand winding of the valve is re-energized in the next described manner.

At a point in the travel of piston 53 during its advance, another contact set 116 may be closed for energizing a similar circuit for driving the right hand winding of solenoid valve 121, in order to cause valve 121 to admit air from reservoir 101 to port 5 of cylinder 3 and to block the flow of air from reservoir 101 through the cylinder's port 4. Upon the closing of contacts 116 and contacts 127 of set 49, the circuit is completed and is traced from ground through make contacts 107, 116, and 127 and the right-hand winding of valve 121 to battery. The operation of valve 121 in this manner is effective for causing the extensible portion of air cylinder 3 to be retracted to its normal position and therewith raises the extended manipulator hand from the position to which it had been depressed by virtue of the previously described operations of valve 121.

*Hand manipulation.*—Upon the positioning of the mechanical hand in space in the manner described above, the program step presently described may include opening or closing the hand in accordance with program needs. In the present case it is assumed that the hand fingers are to be closed and then reopened. Upon the operation of contacts 115 within set 59 and the operation of contacts 123 of set 49 a circuit is completed for energizing the left-hand winding of four-way solenoid valve 124 which controls the admission of air through ports 82b and 82c of air cylinder 82. The circuit for the left-hand winding of valve 124 is traced from ground through make contacts 107, 115, and 123 and the winding of solenoid 124 to battery. Accordingly, valve 124 which normally admits air from reservoir 101 through port 82c of cylinder 82 blocks that path and opens a path from reservoir 101 through port 82b of cylinder 82, with the result that the normally extended cylinder piston 82a is retracted and fingers of the above-described mechanical hand are closed.

As the motion of piston 53 is continued during the cyclical operation of the sequence timer, contacts 115a of set 59 generate a command to close the extended hand fingers. Since the fingers are to be reopened at this time, a similar circuit which includes contacts 123a of set 49 is completed for energizing the right-hand winding of solenoid valve 124 in order to restore valve 124 to its normal condition and therewith admit air through port 82c of air cylinder 82. Operation of valve 124 in this manner causes piston 82a of cylinder 82 to be extended and therewith causes the fingers of the mechanical hand to be driven apart, for instance, for the purpose of relieving a grasped object.

*Withdrawal of the mechanical hand.*—In the event the program step calls for the restoration of the mechanical hand to its normal, retracted position, the operation of contact set 117 during the continuing advance of piston 53 finds contacts 128 of set 49 in operated condition, so that when a retract command is generated by the operation of timer contact 117 within set 59, a circuit is completed for energizing the above-mentioned right-hand winding of valve 114. The circuit is traced from ground through make contacts 107, 117, and 128 and the winding of valve 114 to battery. The resulting operation of valve 114 is effective to admit air from reservoir 101 through the various ports 15 to air cylinders 11, 12, and 13. The admission of air to cylinders 11, 12, and 13 in this manner is effective for causing pistons 16, 17, and 18 to be withdrawn from an extended position to their normal or home positions. The pistons, in returning to their home positions, carry the mechanical hand to its normal, retracted position.

*Interruption of the stored program.*—While the above-described contacts of set 59 define some of the commands generated by the sequence timer and their use in combination with the program step called out by the combination of operated switches in set 49, it may be desirable to hand over control of generating command signals to an external machine, or to issue commands to such an external machine for execution. Accordingly, means comprising contact set 108 is provided for interrupting the operation of the command generating sequence timer and therewith interrupting the execution of the program step currently being executed at any desired point in that program step. When such interruption is to be effected, the member controlling the actuation of contact set 108 is appropriately positioned and contacts 108 are operated at some desired point in the otherwise normal advance of sequence timer piston 53. Consequently, the above-described circuit for maintaining valve 100 open is broken at the break portions of contact 108 and a circuit established to an external machine generally indicated in the drawing as element 130. The release of valve 100 to its closed position shuts off the flow of air through port 52 of cylinder 51 and stops the advance of piston 53. It is assumed that the operation of element 130 is related in some manner to the operational program being carried out by the presently considered manipulator and that continuation of the program is dependent upon the operation of element 130 in such a manner that ground is connected to terminal 132 by apparatus indicated as the phantomed contacts 131. The completion of such a circuit from ground through 131 to terminal 132 is effective for completing over an obvious path a circuit for re-energizing the winding of valve 100. Thus, the operation of the sequence timer is restarted when valve 100 is opened again, so that the advance of piston 53 is allowed to continue. This interruption of sequence timer operation obviously can be made dependent upon the identity of the program step (i.e., the current setting of the drum) by including in the above-traced circuit appropriately operated contacts of set 49.

*Transmission of commands to external machines.*—Provision is made to transmit command signals from the manipulator to an external machine, generally indicated in the drawings as element 133, which machine is assumed to be particularly adapted to utilize a signal comprising a connection to the common ground where such a signal is generated at some point in the execution of a program step. The last-named means comprises contacts 134 in set 60a. Accordingly, the appropriate one of the sequence timer contact actuators is properly positioned so that contacts 134 are operated at the desired point in the advance of piston 53 in the course of operation of the sequence timer. The operation of contacts 134 is effective for delivering a signal over a circuit traced from ground through make contacts 107 and 134 to element 133. Such a signal obviously may be employed to direct the operation of the external machine 133 which may be included in the system in which the presently described program steps are being carried out.

Summary

From the above structural and operational descriptions, it is to be seen that the object manipulator presently shown can be directed through a program of steps wherein each such step is defined as a unique drum index position and the program step to be executed is defined in a mechanical memory as the positions of the stop nut assemblies as well as the operated combination of contacts in switch set 49. For instance, it has been shown that from such a drum index position the mechanical hand may be suitably directed to a particular point in space with respect to a frame member, and further, such a step may include subroutines, such as manipulation of the fingers of the mechanical hand, positioning the hand in a vertical direction with the selected point in space, the transmission of signals to other machinery included in the system and the control of the execution of the step from signals generated from external machinery. Programming a step and its execution can be made among a wide choice possibilities owing to the large possible number of combinations of timing signal sequences which may be generated by the sequence timer (by having the program designer place the contact actuator members appropriately along the lengths of the previously described studs). It is further pointed out that the operations to be carried out in a particular program step may be modified from the results dictated by sequence of signals generated by the timer by virtue of the selectively operative nature of the contacts of set 60 (by having the program designer place the appropriate actuator members on the one of studs 42 which is individual to the program step under consideration and therefore adjacent contact set 60 in positions such that a desired combination of set 60 contacts are operated). In illustration of this last point, the order in which the fingers of the mechanical hand are opened and closed may be selected by the appropriate positioning of the actuator member with respect to contacts 123 and 123a. Another example of the variety which may be achieved in the program is in connection with the interrupt feature described above; should it be desirable to limit the interrupt feature to a particular program step, it would be possible to serially connect one of the set 49 contacts and appropriately position the actuator member on the stud included individual to that one of the program steps wherein it is desired to place control of the continuation of the step and the entire program under the control of apparatus external to the manipulator. Thus, it is to be realized by those skilled in the art that the presently claimed manipulator achieves at relatively low cost a device which is both flexible with respect to the positions in which objects may be manipulated and also the operational program steps which may be carried out in the course of such positioning operations.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a mechanical manipulator, an object engaging device, a frame, means including at least one actuating member for maneuvering said device in space, said actuating member including a piston journaled to said frame and movable along its own length and bearing a detent and further including means for connecting the said piston to said device, a drum also borne by said frame and disposed to revolve about an axis, a plurality of independently settable stop means borne by and disposed on said drum to be brought serially into operative relationship with said piston detent as said drum is revolved, means for indexing said drum to sequentially position said stop means in operating relationship with respect to said piston detent, valve means directively operable for causing said actuating member to extend and retract said piston with respect to said frame, and timer means connected to and cyclically effective for operating said indexing means and said valve means.

2. In a mechanical manipulator; an object engaging device; first, second, and third actuating members; a frame for carrying and disposing said actuating members in non-planar, spaced apart relationship with respect to each other; each of said actuating means including a piston extendable along its own length and bearing a detent; means for connecting each of said pistons to said device; a plurality of sets of stops; each of said stop sets including first, second and third members settable independently of each other and independently of the members of the others of said sets effective upon engaging said piston detents for arresting the movement of the pistons of said first, said second, and said third actuating members, respectively; drum means indexably operative for serially disposing said stop sets in operative relationship with said piston detents; valve means directively operative for causing the various ones of said actuating members to extend and retract said pistons thereof with respect to said frame; index means for directively operating said drum means, and timer means for cyclically operating said index means and said valve means in predetermined sequence, whereby said device may be programmed to move to a plurality of positions in space with respect to said frame in accordance with the settings of said stops in each of the various sets.

3. The mechanical manipulator set forth in claim 2 wherein said timer means has a plurality of outputs and is operative for generating thereon sequences of command signals; said index means and said valve means include apparatus connected to and operative in response to signals from said timer means; and having in addition connecting means including a set of contacts operative in accordance with the position of said indexable means for directively connecting said timer means outputs to said apparatus of said index means and said valve means.

4. In a mechanical manipulator, an object engaging device, a plurality of actuating members, a frame for carrying and disposing said actuating members in spaced apart relationship with respect to each other, each of said members including a piston journaled to said frame and extendable along its own length, means for connecting the free end of said piston to said device, means directively operable for causing said members to extend and retract the various ones of said pistons with respect to said frame, a plurality of stop means borne by said frame, each of said stop means being individual to a particular one of said pistons and being settable independently of the other of said stop means and operative for arresting the motion of that one of said pistons at a desired point along the piston's length of travel, whereby said object engaging device is movable to a particular point in space defined by the setting of the various ones of said stop means.

5. The manipulator set forth in claim 4 and having in addition a damping member comprising an extensible rod which is non-rotatable about its own length; said damping member rod extending between said frame and said device and including means for universally coupling a first end of said member rod to said device, as well as means flexibly coupling the opposite end of said damping member rod to said frame for urging said member to a particular position with respect to said frame, whereby said member urges said device to move along a path that has a consistently varying radius of curvature.

6. In a mechanical manipulator, an object engaging device, a frame, first, second, and third actuating members borne by said frame for directively moving said device to points in space with respect to said frame, each of said actuating means including a piston non-pivotally journaled to said frame and disposed to lie in other than a single plane, said pistons being movable along their own lengths and with respect to said frame, each of said actuating means further including a rod having a first end fixed to said device and a second end pivotally connected to an end of said piston extending beyond said frame, said actuating means rods being fixed rigidly to said device at points lying on other than a straight line, means for directively operating said actuating means, and stop means for controlling the distance through which each of said pistons is advanced, whereby said device may be directively moved to points in space in accordance with the point to which said actuating means pistons are moved as defined by the positioning of said stop means.

7. The manipulator set forth in claim 6 wherein each of said pistons has fixed thereto a detent, said stop means includes a plurality of stop sets; each of said sets having first, second, and third independently positionable stops for engaging said detents borne by and effective for arresting the motion of said pistons of said first, said second, and said third actuating members, respectively; and said stop means further includes a drum on which said stop sets are borne; said drum being rotatable for sequentially positioning said stop sets in operative relationship with the various ones of said piston detents; whereby said device may be directively moved to each of selected positions in space in accordance with the settings of the members in each of said stop sets.

8. The manipulator set forth in claim 7 wherein said drum includes a plurality of cylindrically disposed sets of studs, each stud set bearing one of said stops of the appropriate one of said stop sets, said studs of each set being disposed with respect to each other and to said pistons for positioning the ones of said stops borne thereon to engage said piston detent during the operation of said actuating members, and said stops within each of said sets are independently positionable along the lengths of said studs on which they are borne.

9. In a mechanical manipulator, an object engaging device to be maneuvered in space through a program of steps, a frame, a plurality of control means relating said device to said frame operative for maneuvering said device in space with respect to said frame and for otherwise controlling the operation of said device, a timer having a plurality of outputs, said timer being cyclically operative for generating sequences of command signals on said outputs, means comprising a set of contacts operative for connecting said timer outputs to appropriate ones of said control means, a mechanical memory comprising a drum assembly journaled to said frame to revolve with respect to said contact set, said drum assembly comprising a plurality of settable contact actuators disposed on said assembly to cause said actuator sets to serially engage and therewith selectively operate combinations of contacts in said set in accordance with the needs of a program set under execution.

10. The manipulator set forth in claim 9 wherein said control means includes a plurality of device moving members borne by said frame, each of said members including a piston journaled to said frame and connected to said device in order to allow said device to be moved in space with respect to said frame, a detent borne on each of said pistons, and wherein said memory drum assembly includes a plurality of sets of settable stop means, each of said stop means in each said set to be operative for engaging one of said piston-borne detents and effective for arresting the motion of said pistons in order to maneuver said device to various, predictable points in space with respect to said frame, each of said stop means sets being disposed on said drum with respect to said actuating members to bring a particular one of said stop sets into operative relationship with said actuating pistons in coincidence with positioning of a particular one of said contact actuator sets in operative relationship with said contact set.

11. In a mechanical manipulator having a device which is to be maneuvered in space with respect to a frame, as well as positioning means extending between and connecting said frame to said device and operative for effecting the movement of said device, the combination comprising: a plate included in said device and universally coupled to said positioning means for bearing the remainder of said device and for allowing said device to be rotatably moved about a point on said positioning means, at least three substantially identical members disposed in non-planar relationship to each other, each of said members having opposite ends pivotally secured to said plate and said frame in order to allow said positioning means to direct said device to various points in space, each of said members including a rotatable portion, said members being responsive to the rotation of said rotatable portion for extending the length of said member and, conversely, responsive to change in length of said member for revolving said rotatable portion, and means linking said rotatable portions of all of said members operative for limiting the rotation of said portion of any one of said members to the same angular distance as the said portions of the others of said members, whereby parallelism existing among said members with said device oriented in a particular manner with respect to said frame is preserved throughout the movement of said device to other points in space and parallelism between an arbitrarily defined axis in said device and an arbitrarily defined axis of said frame existing when said device is oriented at a particular point in space is preserved as said device is moved to other points in space.

12. The manipulator of claim 11 wherein each of said members comprises a screw jack having a non-rotatable end, said non-rotatable end being fixed to pivot about a point on said frame and having a threaded portion, said rotatable portion of each member includes a threaded element of said screw jack in telescoping engagement with said non-rotatable end, and said linking means includes substantially identical pulleys fixed to and concentric with each of said rotatable portions as well as a belt having a working surface in engagement with a corresponding surface of each of said pulleys for transmitting rotational movement from any one of said rotatable portions to the rotatable portions of the others of said screw jacks.

References Cited in the file of this patent

UNITED STATES PATENTS

| | | |
|---|---|---|
| 2,781,140 | Cryderman | Feb. 12, 1957 |
| 2,933,205 | MacDonald | Apr. 19, 1960 |
| 2,959,301 | Willsea | Nov. 8, 1960 |